Nov. 26, 1929.　　　W. T. HAINES　　　1,736,785
MEASURING SYSTEM
Filed April 11, 1928　　　2 Sheets-Sheet 1

INVENTOR
W. T. Haines
BY
ATTORNEY

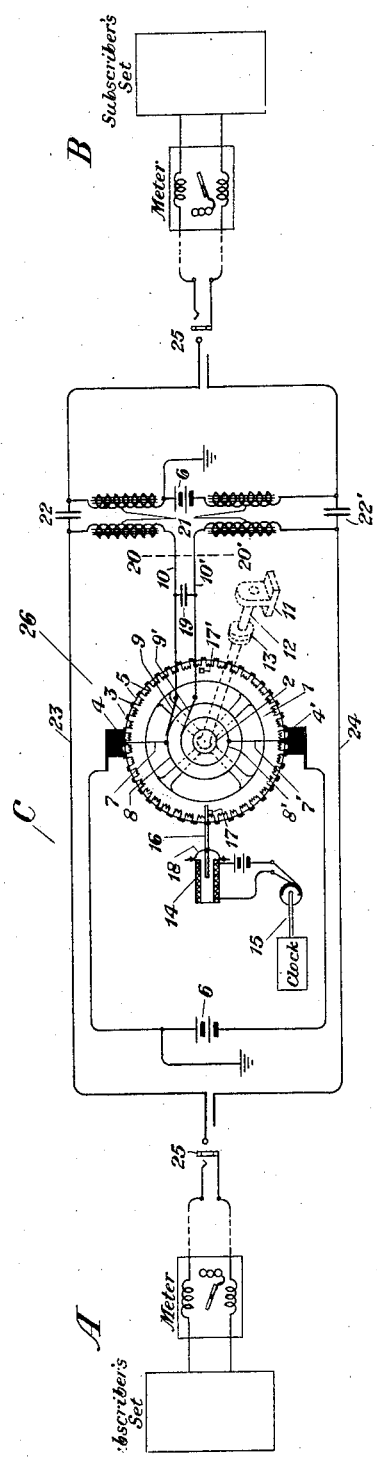

Patented Nov. 26, 1929

1,736,785

UNITED STATES PATENT OFFICE

WILLIAM T. HAINES, OF MOUNTAIN LAKES, NEW JERSEY, ASSIGNOR TO AMERICAN TELEPHONE AND TELEGRAPH COMPANY, A CORPORATION OF NEW YORK

MEASURING SYSTEM

Application filed April 11, 1928. Serial No. 269,237.

This invention relates to measuring systems, and more particularly to telephone systems in which the subscriber is charged for the length of time his telephone is in actual use.

In such systems, a recording meter, located either at the sub-station or at the central office, may be operated periodically during the conversation by reversing the direction of the flow of the current in the telephone circuit at predetermined intervals of time. Where the meter is operated in this manner it is essential that the change in the current from a maximum value of one polarity through zero to a maximum value of the opposite polarity be accomplished as quickly as possible, and that this change take place gradually, for an abrupt change produces objectionable disturbances in the subscriber's line.

It is an object of this invention to provide a system in which, and a novel inexpensive means by which, the current in an electrical circuit may be varied or reversed without producing objectionable disturbances therein or interfering with the efficient use thereof.

The current varying or reversing means comprises a rotating circular rheostat connected between a source of potential and a measuring device and under the control of a clock mechanism.

A better understanding of the invention may be had from the detailed description hereinafter following.

Figure 1:
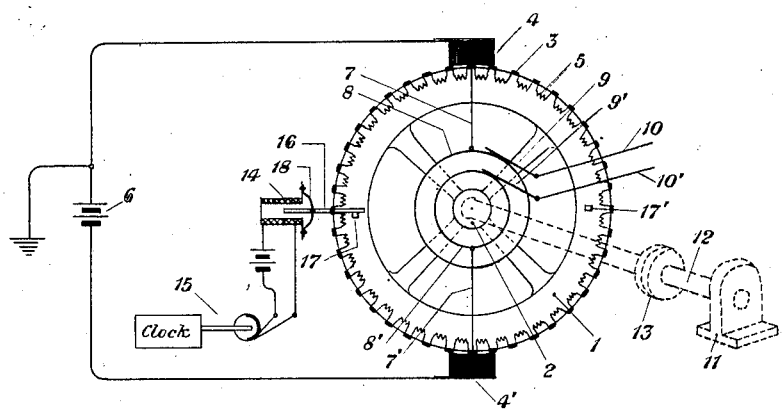
Figure 2:
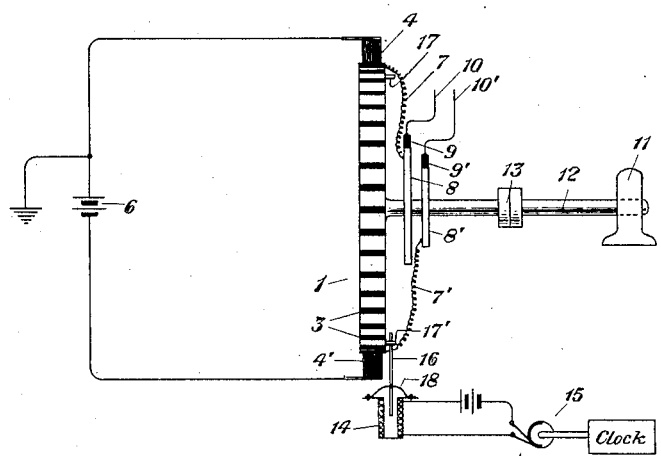

Figure 1 of the drawing illustrates diagrammatically a front view of one embodiment of the reversing means, and Fig. 2 a side view of the same embodiment. Fig 3 represents a telephone system in which the reversing means may be employed.

In Figs. 1 and 2 the particular embodiment of the reversing means shown comprises a ring-shaped element 1 of non-conducting material, supported by a spider 2. This element may be in the form of a disk or in the form of a cylinder. Along the periphery of the ring-shaped element is a series of contacts 3 to insure electrical connection with the brushes 4 and 4'. These brushes may be of gauze construction and be made of any conducting material. Preferably, they should be large enough to be in contact with several of the contacts 3 at all times to avoid any abrupt change or momentary interruption of the current. As shown in the drawing the brushes are positioned opposite each other. However, they may be arranged in other positions with respect to each other, depending upon the character and frequency of current variations desired. Between the contacts 3 is located a plurality of resistance elements 5. The total resistance interposed in the circuit by the reversing means should be sufficiently high to prevent excessive leakage of the battery current and to prevent overheating of the resistance element. The brushes 4 and 4' are electrically connected to the opposite terminals of the source of potential 6 and through the resistance elements to the conductors 7 and 7', respectively, which in turn are connected to the slip rings 8 and 8', respectively. The brushes 9 and 9', connect the slip rings 8 and 8', respectively, with the leads 10 and 10', respectively, which are connected to the two sides of the line circuit through the usual cord circuit. Obviously, the brushes 4 and 4' may be connected to the line circuit and the slip rings 8 and 8' to the source of potential. The ring-shaped element is adapted to rotate one-half revolution at the end of predetermined intervals of time, for example, 15 seconds. This periodic rotation takes place very rapidly, for example, in .01 seconds. The current control means constituting a part of this invention may assume the form of a rotating brush rheostat by making the resistance element stationary and rotating the brushes 4 and 4'. It should be understood that the representation of the resistance elements shown in the drawing is merely diagrammatic. The resistance element may assume the form of a series of resistance wires imbedded in the non-conducting ring-shaped element 1 and connected between the series of contacts 3, as shown, or the ring-shaped element may be made of a resistance material instead of non-conducting material and thus itself constitute the resistance element. In the latter case, the contacts 3 may be eliminated, or may be retained to insure better electrical connection with the brushes 4 and 4' and to avoid wear on the resistance element due to the friction caused by its contact with said brushes. In the former case, the resistance wires, which constitute the resistance element, may be of equal resistance or of unequal resistance. If of unequal resistance, the wires may be arranged so that the resistance interposed at the beginning of the rotating movement is relatively small, and as the rotating movement continues, the rate of increase of the resistance, and hence the rate of decrease of the current, increases until the ring-shaped element reaches the midpoint of its arc of rotation, at which point the resistance is at a maximum and the current zero. As the ring-shaped element is rotated beyond said midpoint, the resistance interposed is relatively great at first and as the rotating movement continues, the rate of decrease of the resistance, and hence the rate of increase of the current in the opposite direction, is increased until the one-half revolution is completed, at which time the resistance is at a minimum and the current at a maximum of the opposite polarity.

Any suitable driving means may be used to cause the rotation and any suitable means may be used to regulate the arc and the time of rotation. As diagrammatically shown, the driving means comprises a continuously revolving motor 11 connected by a shaft 12 through a friction clutch 13 to the spider 2, and the regulating means comprises a solenoid 14 which is momentarily energized at predetermined intervals of time by the closure of its circuit which is controlled by a clock mechanism 15. The solenoid has an armature 16 which, in its normal position, engages one of the stop lugs 17 and 17' which are fastened at opposite points on the surface of the ring-shaped element 1. The momentary energization of the solenoid 14 attracts its armature 16 and releases its engagement with one of the stop lugs 17 or 17'. Immediately thereafter, and before the ring-shaped element has completed its one-half revolution, the solenoid is deenergized and its armature is restored to its normal position by means of ribbon spring 18 to engage the other stop lug 17 or 17', as the case may be, when the one-half revolution is completed. As soon as the stop lug is released from engagement with the armature 16, the ring-shaped element, which is under constant tension due to its connection with the continuously revolving motor 11 through the shaft 12 and the friction clutch 13, rotates one-half revolution at substantially constant speed until its other stop lug engages the armature 16. It is to be understood that this invention is not limited to the particular forms of driving means and regulating means shown.

When the ring-shaped element is in its normal position, it provides substantially no resistance to the current from the source 6 to either side of the line circuit due to the fact that two of the contacts 3 are directly connected to the conductors 7 and 7'. As the ring-shaped element rotates, the resitance in the circuit is gradually increased, by reason of the increase of the number of resistance elements 5 interposed between the brushes 4 and 4' and the conductors 7 and 7', respectively, until said element reaches the midpoint of its arc of rotation. Obviously, as the resistance increases, the current decreases. At the instant that said element reaches its midpoint, the resistance is at a maximum. The current at this instant is zero, due to the fact that there is no difference of potential on the opposite sides of the line. As the ring-shaped element rotates beyond this midpoint, the resistance gradually decreases, by reason of the reduction of the number of resistance elements interposed, until the one-half revolution is completed. Obviously, as the resistance decreases, the current increases in the opposite direction.

The current control device constituting a part of this invention has been shown and described as a reversing means. However, it is to be understood that it may assume the form of a device which varies the current from a maximum to zero and back again to the maximum of the same polarity. Obviously, this may be accomplished by substituting split rings for the slip rings 8 and 8'.

In Fig. 3, two subscribers' stations A and B are shown with subscribers' loops extending to the central office and terminating in the jacks 25. In each subscriber's loop there is located a meter adapted to respond to current reversals therein. The cord circuit C of the central office is here illustrated as the impedance coil feed type. Obviously, a cord circuit of the repeating coil feed type may be used if desired. The cord circuit shown comprises the current source 6, impedance coils 21 through which current is supplied to the line from the source 6, capacities 22 and 22' connected across the terminals of said coils, and current control means 26 adapted to regulate the current supplied to the line from the source 6. On one side the cord circuit is connected directly to the source 6. On the other side the cord circuit is connected to the source 6 through the current control means 26. A filter element 19 may be connected across leads 10 and 10' to prevent any disturbance caused by the operation of the control means from reaching the line circuit. Choke coils also may be included in the circuit for the same purpose. Said current control means is of the same type diagrammatically illustrated in Figs. 1 and 2 and described above. It is to be understood that other forms of circular current control means may be associated with the system illustrated without departing from the scope of this invention.

The operation of the system is as follows:

Assume, for example, that A is the calling subscriber's station and B is the called subscriber's station. When the connection has been completed through the jacks 25 and the current control means 26 has been connected in the circuit, current will flow, for example, from the source 6 through the brush 4, one of the contacts 3, the conductor 7, the slip ring 8, the brush 9, the lead 10, the upper left impedance coil 21, the cord conductor 23, the jack 25 of the calling subscriber, over the calling subscriber's loop, back through the jack 25 of the calling subscriber, the cord conductor 24, the lower left impedance coil 21, the lead 10', the brush 9', the slip ring 8', the conductor 7', another one of the contacts 5 and the brush 4' to the other terminal of the source 6. At this time the control means interposes substantially no resistance in the circuit, and the line current is at a maximum of one polarity. At the end of a predetermined interval of time, for example, 15 seconds, the ring-shaped element 1 is rotated one-half revolution, as hitherto described. As it rotates from its normal position to the midpoint of its arc of rotation, the current in the line circuit is gradually decreased, due to the increase of the number of resistance elements 5, interposed in the circuit between the brushes 4 and 4' and the conductors 7 and 7', respectively. At the instant said ring-shaped element reaches the midpoint of its arc of rotation, there is no difference of potential on the opposite sides of the line, and hence, the current therein is zero. When the ring-shaped element passes this midpoint, the current is reversed, flowing from the brush 4 through the resistance elements 5 to the conductor 7', over the subscriber's loop, and back through the conductor 7 and the resistance elements 5 to the brush 4'. As said ring-shaped element continues to rotate until the one-half revolution is completed, the reversed current is gradually increased, due to the decrease of the number of resistance elements 5 interposed in the circuit between the brushes 4 and 4' and the conductors 7' and 7, respectively. When the one-half revolution is completed, the current is at a maximum in the reverse direction, flowing from the source 6 through the brush 4, one of the contacts 5, the conductor 7', slip ring 8', the brush 9', the lead 10', the lower left impedance coil 21, the cord conductor 24, the jack 25 of the calling subscriber, the cord conductor 23, the upper left impedance coil 21, the lead 10, the brush 9, slip ring 8, the conductor 7, another one of the contacts 5, and the brush 4' to the other terminal of the source 6. These reversals take place during the conversation at predetermined intervals of time, and each reversal causes the operation of the meter located in the calling subscriber's loop.

As above pointed out, the current control means is shown on one side of the cord circuit only, since in general it is desirable to charge the call to the calling subscriber only. It is obvious, however, that the same mechanism could be applied on the other side of the cord circuit, or on both sides of the cord circuit, if desired. The current control means, which is shown at the left of the dotted line 20—20', may be common to all of the cords of a given exchange, or to a group of cords, or, if desired, may be supplied for each cord separately. Likewise, said current control means may be associated with the cord circuit through the calling supervisory relay or through other means in such a manner that the operation of the meter will begin at any desired time during the connection, for example, when the called subscriber answers.

Furthermore, this invention may be used in connection with systems in which the subscriber is charged for the number of calls made, or for the length of each call, or for both the number of calls made and the length of each call or in which the charge is made on a multiple basis.

While the invention has been illustrated in connection with a typical cord circuit used in manual operation, it is apparent that it is equally applicable to machine-switching apparatus.

What is claimed is:

1. In combination, a circular resistance element, contacts located along the periphery of said resistance element, brushes positioned near the periphery of said resistance element and adapted to be in electrical connection between said contacts and a source of potential, means for connecting a predetermined pair of said contacts with a plurality of electrical circuits, and means for periodically rotating said resistance element one-half revolution.

2. In combination, a ring-shaped element of non-conducting material, contacts located along the periphery of said ring-shaped element, resistance wires electrically connected between said contacts, brushes positioned near the periphery of said ring-shaped element at opposite sides thereof and adapted to be in electrical connection with said contacts and a source of potential, means for connecting a predetermined pair of said contacts with a plurality of electrical circuits, means for rotating said ring-shaped element, and means for regulating the time and arc of rotation of said ring-shaped element.

3. In combination, a ring-shaped element of non-conducting material, contacts located along the periphery of said ring-shaped element, resistance wires of unequal resistance electrically connected between said contacts, brushes positioned near the periphery of said ring-shaped element at opposite sides thereof and adapted to be in electrical connection with said contacts and a source of potential, means for connecting a predetermined pair of said contacts with a plurality of electrical circuits, means for rotating said ring-shaped element, and means for regulating the time and arc of rotation of said ring-shaped element.

4. In a telephone system, a central office, subscribers' stations adapted to be connected thereto, connecting circuits at said central office, polarized metering apparatus adapted to register the period of use of the subscribers' stations, a source of current, means for reversing the polarity of said current source with respect to said connecting circuits, and an electrical filtering device connected between said reversing means and said connecting circuits, said reversing means comprising a circular resistance element, contacts located along the periphery of said resistance element, brushes positioned near the periphery of said resistance element and adapted to be in electrical connection between said contacts and the source of potential, means for connecting a predetermined pair of said contacts with said connecting circuits, and means for periodically rotating said resistance element one-half revolution.

5. In a telephone system, a central office, subscribers' stations adapted to be connected thereto, connecting circuits at said central office, metering apparatus adapted to be operated by current variations therein, a source of potential, current control means comprising a ring-shaped element of non-conducting material, contacts located along the periphery of said ring-shaped element, resistance wires electrically connected between said contacts, brushes positioned near the periphery of said ring-shaped element at opposite sides thereof and adapted to be in electrical connection with said contacts and said source of potential, means for connecting a predetermined pair of said contacts with said connecting circuits, means for rotating said ring-shaped element, and means for regulating the time and arc of rotation of said ring-shaped element.

6. In a telephone system, a central office, subscribers' stations adapted to be connected thereto, connecting circuits at said central office, metering apparatus adapted to be operated by current variations therein, a source of potential and current control means comprising a ring-shaped element of non-conducting material, contacts located along the periphery of said ring-shaped element, resistance wires of unequal resistance electrically connected between said contacts, brushes positioned near the periphery of said ring-shaped element at opposite sides thereof and adapted to be in electrical connection with said contacts and said source of potential, means for connecting a predetermined pair of contacts with said connecting circuits, means for rotating said ring-shaped element, and means for regulating the time and arc of rotation of said ring-shaped element.

In testimony whereof, I have signed my name to this specification this 10th day of April, 1928.

WILLIAM T. HAINES.